(12) United States Patent
Kimura

(10) Patent No.: US 9,810,208 B2
(45) Date of Patent: Nov. 7, 2017

(54) CRYOPUMP AND METHOD FOR REGENERATING THE CRYOPUMP USING TWO-STAGE DISCHARGE PROCESS

(71) Applicant: Sumitomo Heavy Industries, Ltd., Tokyo (JP)

(72) Inventor: Toshiyuki Kimura, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 219 days.

(21) Appl. No.: 14/206,510

(22) Filed: Mar. 12, 2014

(65) Prior Publication Data

US 2014/0260338 A1   Sep. 18, 2014

(30) Foreign Application Priority Data

Mar. 12, 2013   (JP) .................................. 2013-049483

(51) Int. Cl.
*B01D 8/00*   (2006.01)
*F04B 37/08*   (2006.01)
*F04B 37/00*   (2006.01)

(52) U.S. Cl.
CPC ............ *F04B 37/085* (2013.01); *F04B 37/08* (2013.01); *B01D 8/00* (2013.01); *F04B 37/00* (2013.01)

(58) Field of Classification Search
CPC ........ F04B 37/00; F04B 37/08; F04B 37/085; B01D 8/00
See application file for complete search history.

(56) References Cited

U.S. PATENT DOCUMENTS

| 5,375,424 | A | * | 12/1994 | Bartlett | .................. | F04B 37/08 |
| | | | | | | 417/901 |
| 5,517,823 | A | * | 5/1996 | Andeen | ................. | F04B 37/085 |
| | | | | | | 417/901 |
| 5,862,671 | A | * | 1/1999 | Lessard | ................. | F04B 37/085 |
| | | | | | | 417/901 |
| 8,959,933 | B2 | | 2/2015 | Ando | | |
| 2007/0125112 | A1 | * | 6/2007 | Tsuyuki | .................. | F04B 37/08 |
| | | | | | | 62/272 |
| 2009/0165471 | A1 | * | 7/2009 | Rafalovich | ............. | F25C 5/187 |
| | | | | | | 62/66 |
| 2012/0285182 | A1 | * | 11/2012 | Ando | ...................... | F04B 37/08 |
| | | | | | | 62/55.5 |

(Continued)

FOREIGN PATENT DOCUMENTS

JP    09-014133 A    1/1997
JP    2002-249876 A    9/2002

(Continued)

*Primary Examiner* — David Teitelbaum
(74) *Attorney, Agent, or Firm* — Michael Best & Friedrich LLP

(57) ABSTRACT

A method of regenerating a cryopump includes a first discharging process that includes alternately evacuating a cryopump housing and supplying a purge gas in a first pressure range, and a second discharging process that includes evacuating the cryopump housing to a low pressure region below the first pressure range. The second discharging process includes making a determination at least once in the low pressure range as to whether the second discharging process should be terminated, and supplying the purge gas to the cryopump housing prior to a first-time determination as to whether the second discharging process should be terminated.

11 Claims, 3 Drawing Sheets

(56) References Cited

U.S. PATENT DOCUMENTS

2012/0317999 A1* 12/2012 Koyama ................ F04B 37/08
                                                                                     62/55.5
2015/0121907 A1    5/2015 Ando

FOREIGN PATENT DOCUMENTS

| JP | 2009-156220 A | 7/2009 |
|----|---------------|--------|
| JP | 2012-237293 A | 12/2012 |
| JP | 2013-002328 A | 1/2013 |
| WO | WO-2005/052369 A1 | 6/2005 |

* cited by examiner

CRYOPUMP AND METHOD FOR REGENERATING THE CRYOPUMP USING TWO-STAGE DISCHARGE PROCESS

BACKGROUND OF THE INVENTION

1. Field of the Invention

The present invention relates to a cryopump and a method for regenerating the cryopump.

2. Description of the Related Art

A cryopump is a vacuum pump that traps and pumps gas molecules by condensing or adsorbing them on cryopanels cooled to ultracold temperatures. The cryopump is generally used to attain a clean vacuum environment required for a semiconductor circuit manufacturing process, for instance. The cryopump, which is a so-called entrapment vacuum pump, needs regeneration by which the trapped gas is periodically released to the outside. One of the issues in regeneration of the cryopump is discharging of water.

SUMMARY OF THE INVENTION

An exemplary purpose of an embodiment of the present invention is to promote discharging of water in regenerating a cryopump.

According to one embodiment of the present invention there is provided a cryopump that includes a cryopanel; a cryopump housing arranged to enclose the cryopanel; a control unit configured to control evacuation of the cryopump housing and supply of a purge gas to the cryopump housing for regeneration of the cryopanel, wherein the control unit performs a first discharging process that includes alternately evacuating the cryopump housing and supplying the purge gas in a first pressure range, and a second discharging process that includes evacuating the cryopump housing to a low pressure region below the first pressure range, and the second discharging process includes making a determination at least once in the low pressure region as to whether the second discharging process should be terminated, and supplying the purge gas to the cryopump housing prior to a first-time determination as to whether the second discharging process should be terminated.

According to another embodiment of the present invention there is provided a method of regenerating a cryopump including: a first discharging process that includes alternately evacuating a cryopump housing and supplying a purge gas in a first pressure range, and a second discharging process that includes evacuating the cryopump housing to a low pressure region below the first pressure range, wherein the second discharging process includes making a determination at least once in the low pressure region as to whether the second discharging process should be terminated, and supplying the purge gas to the cryopump housing prior to a first-time determination as to whether the second discharging process should be terminated.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
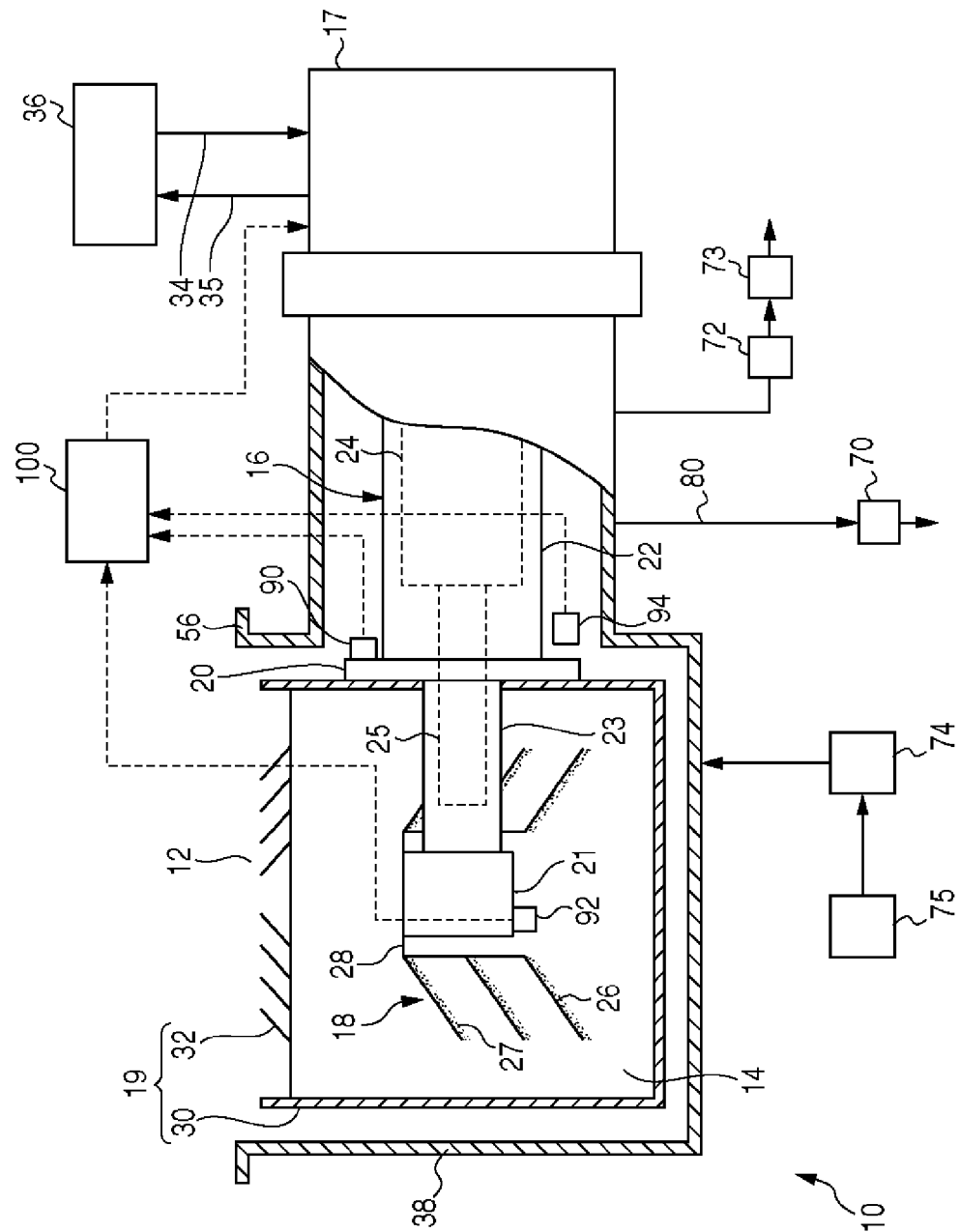
FIG. 1 is a schematic diagram showing a cryopump according to an embodiment of the present invention.

FIG. 1 is a schematic view illustrating a cryopump 10 according to an embodiment of the present invention. The cryopump 10, which is mounted, for example, to a vacuum chamber such as an ion implantation apparatus or a sputtering apparatus, is used to raise the degree of vacuum inside the vacuum chamber to a level required of a desired process.

The cryopump 10 has an inlet 12 for receiving a gas. The inlet 12 is an entrance to an internal space 14 of the cryopump 10. A gas to be pumped enters the internal space 14 of the cryopump 10 through the inlet 12 from the vacuum chamber to which the cryopump 10 is mounted.

It is to be noted that the terms "axial direction" and "radial direction" may be used in the following description to clearly show the positional relationships between the constituent parts of the cryopump 10. The axial direction represents a direction passing through the inlet 12, whereas the radial direction represents a direction along the inlet 12. For convenience, with respect to the axial direction, positions relatively closer to the inlet 12 may be described as "above", and positions relatively farther from the inlet 12 as "below". That is, positions relatively farther from the bottom of the cryopump 10 may be described as "above", and positions relatively closer thereto as "below". With respect to the radial direction, positions closer to the center of the inlet 12 may be described as "inside", and positions closer to the periphery of the inlet 12 as "outside". However, it is to be noted that these descriptions do not limit to a specific location and/or orientation of the cryopump 10 as mounted to the vacuum chamber. For example, the cryopump 10 may be mounted to the vacuum chamber with the inlet 12 facing downward in the vertical direction.

The cryopump 10 includes a low-temperature cryopanel 18 and a high-temperature cryopanel 19. Further, the cryopump 10 includes a cooling system configured to cool the high-temperature cryopanel 19 and the low-temperature cryopanel 18. The cooling system includes a refrigerator 16 and a compressor 36.

The refrigerator 16 is a cryogenic refrigerator, such as, for example, a Gifford-McMahon refrigerator (so-called GM refrigerator). The refrigerator 16 is a two-stage type refrigerator including a first stage 20, a second stage 21, a first cylinder 22, a second cylinder 23, a first displacer 24, and a second displacer 25. Accordingly, the high-temperature stage of the refrigerator 16 includes the first stage 20, the first cylinder 22, and the first displacer 24. The low-temperature stage of the refrigerator 16 includes the second stage 21, the second cylinder 23, and the second displacer 25.

The first cylinder 22 and the second cylinder 23 are connected in series. The first stage 20 is installed in a joint portion between the first cylinder 22 and the second cylinder 23. The second cylinder 23 connects the first stage 20 and the second stage 21. The second stage 21 is installed at the end of the second cylinder 23. The first displacer 24 and the second displacer 25 are arranged inside the first cylinder 22 and the second cylinder 23, respectively, so as to be movable in the longitudinal direction of the refrigerator 16 (the horizontal direction in FIG. 1). The first displacer 24 and the second displacer 25 are connected together so as to be movable integrally. A first regenerator and a second regenerator (not illustrated) are installed within the first displacer 24 and the second displacer 25, respectively.

The refrigerator 16 includes a drive mechanism 17 provided at the high-temperature end of the first cylinder 22. The drive mechanism 17 is connected to the first displacer 24 and the second displacer 25 such that the first displacer 24 and the second displacer 25 can be moved in a reciprocal manner inside the first cylinder 22 and the second cylinder 23, respectively. The drive mechanism 17 includes a flow channel switching mechanism that switches the flow channels of an operating gas such that intake and discharge of the gas are periodically repeated. The flow channel switching mechanism includes, for example, a valve unit and a drive unit for driving the valve unit. The valve unit includes, for example, a rotary valve, and the drive unit includes a motor for rotating the rotary valve. The motor may be, for example, an AC motor or a DC motor. The flow channel switching mechanism may be a mechanism of a direct acting type that is driven by a linear motor.

The refrigerator 16 is connected to the compressor 36 via a high-pressure conduit 34 and a low-pressure conduit 35. The refrigerator 16 generates cold on the first stage 20 and the second stage 21 by expanding, in the inside thereof, the high-pressure operating gas (e.g., helium) supplied from the compressor 36. The compressor 36 recovers the operating gas that has been expanded in the refrigerator 16, and increases the pressure thereof again to supply to the refrigerator 16.

More specifically, the drive mechanism 17 first communicates the high-pressure conduit 34 with the internal space of the refrigerator 16. The high-pressure operating gas is supplied from the compressor 36 to the refrigerator 16 through the high-pressure conduit 34. When the internal space of the refrigerator 16 is filled with the high-pressure operating gas, the drive mechanism 17 switches the flow channel so as to communicate the internal space of the refrigerator 16 with the low-pressure conduit 35. Thereby, the operating gas is expanded. The expanded operating gas is recovered into the compressor 36. In synchronization with such supply and discharge of the operating gas, the first displacer 24 and the second displacer 25 move in a reciprocal manner inside the first cylinder 22 and the second cylinder 23, respectively. The refrigerator 16 generates cold on the first stage 20 and the second stage 21 by repeating such heat cycles.

The refrigerator 16 is configured to cool the first stage 20 to a first temperature level and the second stage 21 to a second temperature level. The second temperature level is lower than the first temperature level. For example, the first stage 20 is cooled to approximately 65 K to 120 K, and preferably to 80 K to 100 K, whereas the second stage 21 is cooled to approximately 10 K to 20 K.

FIG. 1 illustrates a section including both of the central axis of the internal space 14 of the cryopump 10 and the central axis of the refrigerator 16. The cryopump 10 illustrated therein is a so-called horizontal cryopump. The horizontal cryopump generally means a cryopump in which the refrigerator 16 is so arranged as to intersect (normally intersect perpendicularly) with the central axis of the internal space 14 of the cryopump 10. Similarly, the present invention is applicable also to a so-called vertical cryopump. The vertical cryopump means a cryopump in which a refrigerator is arranged along the axial direction of the cryopump.

The low-temperature cryopanel 18 is provided in the central portion of the internal space 14 of the cryopump 10. The low-temperature cryopanel 18 includes, for example, a plurality of panel members 26. Each of the panel members 26 has, for example, the shape of a side surface of a truncated cone, so to speak, an umbrella-like shape. An adsorbent 27, such as activated carbon, is normally provided in each panel member 26. The adsorbent 27 is, for example, adhered to the rear surface of the panel member 26. Thus, the low-temperature cryopanel 18 includes an adsorption region for adsorbing gas molecules.

The panel members 26 are mounted to a panel mounting member 28. The panel mounting member 28 is mounted to the second stage 21. Thus, the low-temperature cryopanel 18 is thermally connected to the second stage 21. Accordingly, the low-temperature cryopanel 18 is cooled to the second temperature level.

The high-temperature cryopanel 19 includes a radiation shield 30 and an inlet cryopanel 32. The high-temperature cryopanel 19 is provided outside the low-temperature cryopanel 18 so as to surround the low-temperature cryopanel 18. The high-temperature cryopanel 19 is thermally connected to the first stage 20, and accordingly the high-temperature cryopanel 19 is cooled to the first temperature level.

The radiation shield 30 is provided mainly for protecting the low-temperature cryopanel 18 from the radiant heat from a housing 38 of the cryopump 10. The radiation shield 30 is located between the housing 38 and the low-temperature cryopanel 18 and encloses the low-temperature cryopanel 18. The axial upper end of the radiation shield 30 is opened toward the inlet 12. The radiation shield 30 has a tubular shape (e.g., cylindrical shape) whose axial lower end is closed, and is formed into a cup-like shape. A hole for mounting the refrigerator 16 is provided in a side surface of the radiation shield 30, and the second stage 21 is inserted into the radiation shield 30 therefrom. The first stage 20 is fixed, at the outer circumferential portion of the mounting hole, to the external surface of the radiation shield 30. Thus, the radiation shield 30 is thermally connected to the first stage 20.

The inlet cryopanel 32 is disposed along the radial direction on the inlet 12. The inlet cryopanel 32, with its outer periphery secured to the opening end of the radiation shield 30, is thermally coupled to the radiation shield 30. The inlet cryopanel 32 is disposed axially above the low-temperature cryopanel 18. The inlet cryopanel 32 is formed into a louver structure or a chevron structure, for instance. The inlet cryopanel 32 may be formed concentrically with the central axis of the radiation shield 30 or may be formed into a grid-like or any other shape.

The inlet cryopanel 32 is provided for pumping a gas entering the inlet 12. A gas that condenses at the temperature of the inlet cryopanel 32 (e.g., moisture) is captured on the surface of the inlet cryopanel 32. The inlet cryopanel 32 is provided also for protecting the low-temperature cryopanel 18 from the radiation heat from a heat source outside the cryopump 10 (e.g., a heat source inside the vacuum chamber to which the cryopump 10 is mounted). The inlet cryopanel 32 also restricts the entry of not only the radiation heat but also gas molecules. The inlet cryopanel 32 occupies part of the opening area of the inlet 12, thereby limiting the entry of a gas into the internal space 14 through the inlet 12 to a desired amount.

The cryopump 10 is provided with the housing 38. The housing 38 is a vacuum vessel separating the inside of the cryopump 10 from the outside. The housing 38 is so configured as to airtightly maintain the pressure inside the internal space 14 of the cryopump 10. The housing 38, which is provided outside the high-temperature cryopanel 19, encloses the high-temperature cryopanel 19. Also, the housing 38 has the refrigerator 16 therewithin. In other words, the housing 38 is a cryopump housing enclosing the high-temperature cryopanel 19 and the low-temperature cryopanel 18.

The housing 38 is fixed to a portion having the ambient temperature (e.g., a high-temperature part of the refrigerator 16) in such a manner that the housing 38 does not touch the high-temperature cryopanel 19 and a low-temperature part of the refrigerator 16. The external surface of the housing 38, which is exposed to the outside environment, has a temperature higher than that of the cooled high-temperature cryopanel 19 (e.g., approximately room temperature).

Also, the housing 38 has an inlet flange 56 extending radially outward from the opening end thereof. The inlet flange 56 serves as a flange by which to mount the cryopump 10 to the vacuum chamber. A gate valve (not shown) is provided at the opening of the vacuum chamber, and the inlet flange 56 is attached to the gate valve. Therefore, the gate valve is located axially above the inlet cryopanel 32. The gate valve may be closed when the cryopump 10 is regenerated, and the gate valve may be opened when the vacuum chamber is evacuated by the cryopump 10.

A vent valve 70, a rough valve 72, and a purge valve 74 are connected to the housing 38.

The vent valve 70 is provided at one end of an exhaust line 80 for exhausting fluid from the internal space of the cryopump 10 to an external environment, for instance. Opening the vent valve 70 permits the flow of the exhaust line 80, whereas closing the vent valve 70 blocks the flow of the exhaust line 80. Though fluid to be discharged through the vent valve 70 is basically a gas, it may be liquid or a mixture of liquid and gas. For example, liquefied gas that has been condensed by the cryopump 10 may be mixed in the fluid to be discharged. By opening the vent valve 70, a positive pressure occurring within the housing 38 can be released to the outside.

The rough valve 72 is connected to a roughing pump 73. By opening or closing the rough valve 72, the roughing pump 73 and the cryopump 10 communicate with each other or are cut off from each other. Opening the rough valve 72 has the roughing pump 73 and the housing 38 communicate with each other. Closing the rough valve 72 cuts off the passage between the roughing pump 73 and the housing 38. By opening the rough valve 72 and operating the roughing pump 73, the inside of the cryopump 10 can be depressurized.

The roughing pump 73 is for vacuum pumping of the cryopump 10. The roughing pump 73 is a vacuum pump configured to provide a base pressure zone to the cryopump 10. The base pressure zone corresponds to a low-vacuum region in the operating pressure range of the cryopump 10. The base pressure zone includes an operation start pressure of the cryopump 10. The roughing pump 73 is capable of depressurizing the housing 38 from the atmospheric pressure to the base pressure zone. The base pressure zone corresponds to a high-vacuum region of the roughing pump 73. Accordingly, the base pressure zone is included in an overlapped portion between the operating pressure range of the roughing pump 73 and that of the cryopump 10. For example, the base pressure zone is in the range of 1 Pa to 50 Pa, both inclusive. For example, the base pressure zone is on the order of 10 Pa.

Typically, the roughing pump 73 is a provided as a vacuum device separate from the cryopump 10. For example, the roughing pump 73 constitutes a part of a vacuum system that includes the vacuum chamber to which the cryopump 10 is connected. The cryopump 10 is a main pump for the vacuum chamber and the roughing pump 73 is an auxiliary pump.

The purge valve 74 is connected to a purge gas source 75. The purge gas is a nitrogen gas, for instance. The purge gas may be a dry gas or a hot gas, which may have a temperature higher than the room temperature for instance. By opening or closing the purge valve 74, the purge gas source 75 and the cryopump 10 communicate with each other or are cut off from each other. Supply of the purge gas to the cryopump 10 is controlled accordingly. The flow of the purge gas from the purge gas source 75 to the housing 38 is permitted by opening the purge valve 74. The flow of the purge gas from the purge gas source 75 to the housing 38 is cut off by closing the purge valve 74. By opening the purge valve 74 and introducing the purge gas from the purge gas source 75 to the housing 38, the pressure inside the cryopump 10 can be raised.

The cryopump 10 includes a first temperature sensor 90 for measuring the temperature of the first stage 20 and a second temperature sensor 92 for measuring the temperature of the second stage 21. The first temperature sensor 90 is mounted to the first stage 20. The second temperature sensor 92 is mounted to the second stage 21. Alternatively, the first temperature sensor 90 may be mounted to the high-temperature cryopanel 19. The second temperature sensor 92 may be mounted to the low-temperature cryopanel 18.

A pressure sensor 94 is provided inside the housing 38. The pressure sensor 94 is located outside the high-temperature cryopanel 19 and is provided near the refrigerator 16, for instance. The pressure sensor 94 periodically measures the pressure within the housing 38 and outputs a signal indicating the measured pressure to a control unit 100. The pressure sensor 94 is connected to the control unit 100 so that the signal outputted from the pressure sensor 94 can be supplied to the control unit 100.

The pressure sensor 94 has a wide range of measurements including both a high vacuum level attained by the cryopump 10 and the atmospheric pressure level. This range of measurements preferably includes at least a range of pressures that can possibly take on during a regeneration process. Thus the lower limit of the range of measurements in the pressure sensor 94 may be on the order of 1 Pa (or 10 Pa), for instance, and the upper limit thereof may be on the order of $10^5$ Pa, for instance. Alternatively, the arrangement may be such that the cryopump 10 is provided with both a first pressure sensor for vacuum level measurements and a second pressure sensor for atmospheric pressure level measurements.

For example, the pressure sensor 94 may be a crystal gauge. The crystal gauge is a sensor for measuring pressures making use of the phenomenon of a quartz oscillator changing its oscillation resistance in response to the pressure. The pressure sensor 54 may be a thermal conductivity gauge such as a Pirani gauge, or a hot cathode ionization gauge.

The cryopump 10 includes the control unit 100 for controlling the cryopump 10. The control unit 100 may be provided integrally with the cryopump 10 or may be configured as a separate controller that can be disposed away from the cryopump 10.

The control unit 100 is so configured as to control the refrigerator 16 to carry out a vacuum pumping operation and a regeneration operation of the cryopump 10. The control unit 100 is configured to control evacuation of the cryopump housing and supply of the purge gas to the cryopump housing in order for the regeneration of the cryopanels. Also, the control unit 100 controls the opening and closing of the vent valve 70, the rough valve 72 and the purge valve 74, representatively when needed during the regeneration. The control unit 100 is configured such that the measurement results of various sensors such as the first temperature sensor 90, the second temperature sensor 92 and the pressure sensor 94 can be received. Based on those measurement results, the control unit 100 computes instructions to be given to the refrigerator 16 and the valves.

In the vacuum pumping operation, the control unit 100 controls the refrigerator 16 in such a manner, for example, that a stage temperature (e.g., first-stage temperature) follows a target cooling temperature. The target temperature of the first stage 20 is typically set to a constant value. The target temperature of the first stage 20 is determined to be a certain value as specifications according to a process performed in the vacuum chamber attached to the cryopump 10.

An operation of the cryopump 10 configured as above is now explained hereunder. As the cryopump 10 is to be operated, the interior of the cryopump 10 is first roughly evacuated to an operation start pressure (e.g., about 1 Pa-10 Pa) by using the roughing pump 73 through the rough valve 72 before the operation starts. Then the cryopump 10 is operated. The first stage 20 and the second stage 21 are cooled under the control of the control unit 100 by driving the refrigerator 16. This also cools the high-temperature cryopanel 19 and the low-temperature cryopanel 18 that are thermally coupled to the first stage 20 and the second stage 21, respectively.

The inlet cryopanel 32 cools gas molecules coming from the vacuum chamber into the cryopump 10 and condenses a gas, whose vapor pressure gets sufficiently low by this cooling temperature (e.g., water or the like), on the surface of the inlet cryopanel 32 so that the gas is removed from the vacuum chamber. On the other hand, a gas, whose vapor pressure does not become sufficiently low by the cooling temperature of the inlet cryopanel 32, passes through the inlet cryopanel 32 and enters inside the radiation shield 30. Of the gas has entered inside the radiation shield 30, a gas whose vapor pressure becomes sufficiently low by the cooling temperature of the low-temperature cryopanel 18 is condensed for removal on a surface of the low-temperature cryopanel 18. A gas, whose vapor pressure does not become sufficiently low even by the cooling temperature of the low-temperature cryopanel 18 (e.g., hydrogen or the like), is adsorbed for removal by an adsorbent 27 adhered to the surface of the low-temperature cryopanel 18. In this manner, the cryopump 10 can attain a desired degree of vacuum in the vacuum chamber attached to the cryopump 10.

As the pumping operation continues, the gases are accumulated in the cryopump 10. In order that the accumulated gases can be discharged to the outside, the cryopump 10 is regenerated when a predetermined regeneration-start condition is met. The regeneration-start condition includes a condition where a predetermined length of time has elapsed after the start of the pumping operation, for instance. The regeneration includes a temperature-raising process, a discharging process, and a cooling process. The discharging process includes a first discharging process and a second discharging process.

The regeneration process of the cryopump 10 is controlled by the control unit 100. The control unit 100 determines whether the predetermined regeneration-start condition is satisfied, and starts the regeneration if the condition is satisfied. If the condition is not satisfied, the control unit 100 will not start the regeneration and continue the vacuum pumping operation.

Figure 2:
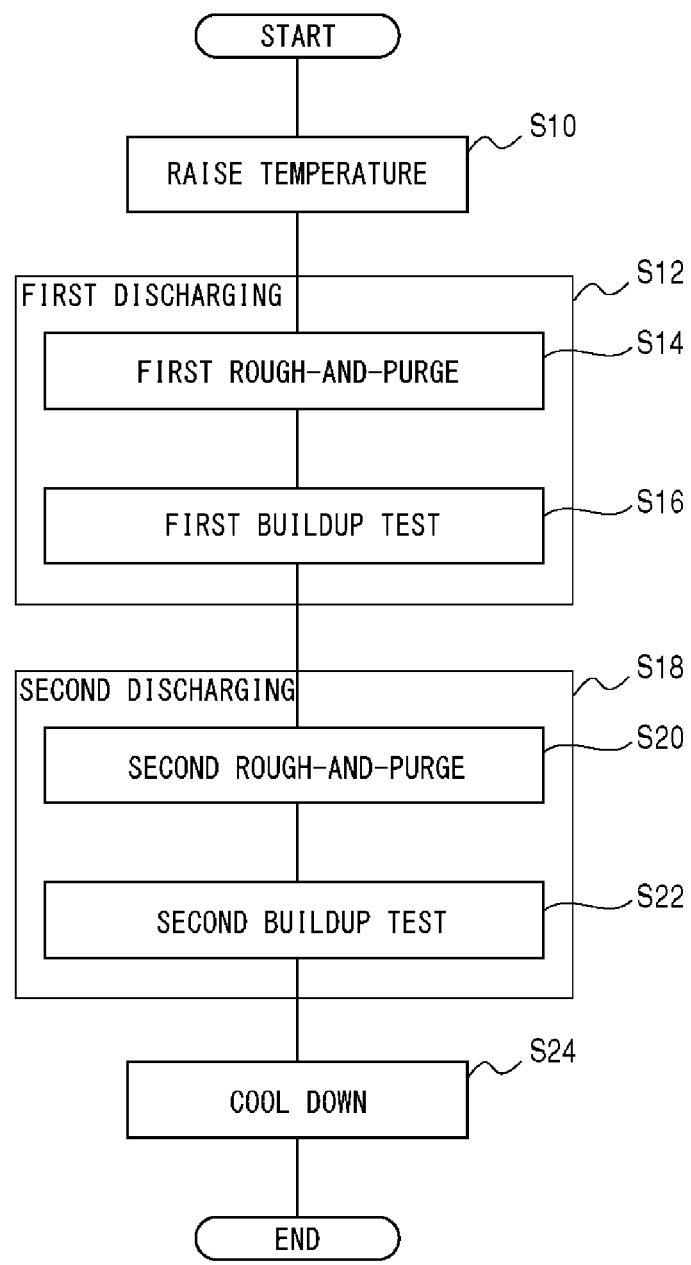
FIG. 2 a flowchart to explain a regeneration method according to an embodiment of the present invention.

FIG. 2 a flowchart to explain a regeneration method according to an embodiment of the present invention. The regeneration includes the temperature-raising process or step of raising the temperature of the cryopump 10 to a regeneration temperature, which is higher than the temperature of the cryopanel during the pumping operation (S10). The exemplary regeneration process shown in FIG. 2 is a so-called "full regeneration". The full regeneration regenerates all cryopanels including the high-temperature cryopanel 19 and the low-temperature cryopanel 18. The cryopanels 18 and 19 are heated starting from the cooling temperature required for the vacuum pumping operation up to the regeneration temperature, for example, at about ordinary temperature (e.g., about 300 K).

The temperature-raising process includes a so-called reversal heating. The refrigerator 16 is operated so that the operation gas can undergo adiabatic compression. The refrigerator 16 heats up the cryopanels 18 and 19, and the adsorbent 27 through the obtained compression heat. The temperature-raising process may include heating the cryopanels 18 and 19, and the adsorbent 27 using a heater (not shown) installed in the cryopump 10 and/or the refrigerator 16.

The temperature-raising process may include heating the cryopanels 18 and 19, and the adsorbent 27, using the purge gas. In this case, the temperature-raising process may include starting the supply of the purge gas to the cryopump 10. The control unit 100 opens the purge valve 74 so as to introduce the purge gas into the internal space 14 of the cryopump 10. The supplied purge gas is discharged from the cryopump 10 via the vent valve 70.

In the temperature-raising process, the control unit 100 determines whether the measurement of the cryopanel temperature reaches the regeneration temperature. The control unit 100 continues the temperature-raising process until the regeneration temperature is reached and terminates the temperature-raising process when the regeneration temperature is reached. When reversal heating of the refrigerator 16 is performed, the control unit 100 may terminate the temperature-raising process concurrently with stopping the operation of the refrigerator 16. The control unit 100 may terminate the purge concurrently with stopping the operation of the refrigerator 16. Alternatively, the control unit 100 may continue the supply of the purge gas for a predetermined duration of time even after the operation of the refrigerator 16 is stopped (so-called "extended purge").

Subsequent to the termination of the temperature-raising process, the control unit 100 performs the first discharging process (S12) and the second discharging process (S18) in the stated order. In these discharging processes, the gas re-vaporized from the surface of the cryopanels is discharged outside the cryopump 10. The re-vaporized gas is discharged outside via the exhaust line 80 or by using the roughing pump 73, for instance. The re-vaporized gas is discharged, together with the purge gas introduced as necessary, from the cryopump 10. During the discharging processes, the temperature-raising operation of the refrigerator 16 may be continued or the operation of the refrigerator 16 may be stopped.

The first discharging process or step is a process mainly for vaporizing water condensed on the cryopanels 18 and 19 and discharging the resultant water vapor. The first discharging process includes the first rough-and-purge (S14) and the first buildup test (S16). In other words, the first rough-andpurge and the first buildup test are configured to discharge the water condensed on the cryopanels 18 and 19 from the cryopump 10.

Rough-and-purge is a process in which rough evacuation of the housing 38 and the supply of the purge gas are performed alternately. In rough-and-purge, a combination of roughing and purge is performed once or a plurality of times. Typically, the control unit 100 selectively performs roughing or purge during rough-and-purge. In other words, while roughing (or purge) is performed, purge (or roughing) is suspended. Alternatively, rough-and-purge may be performed such that while one of roughing and purge is being performed continuously, the other of roughing and purge may be performed intermittently. This is also seen as being equivalent to roughing and supply of the purge being performed alternately. Roughing and purge may be started and terminated in accordance with the pressure in the housing 38 or an elapsed time, as described later.

When the temperature-raising process is terminated, the control unit 100 starts the first rough-and-purge. Initially, the control unit 100 starts rough evacuation of the housing 38. The control unit 100 closes the purge valve 74 and opens the rough valve 72. Roughing reduces the pressure inside the housing 38. For convenience, roughing and purge steps in the first rough-and-purge may be referred to as the first roughing and the first purge, respectively.

A termination pressure is defined for the first roughing. The termination pressure of the first roughing is higher than the base pressure zone. For example, the termination pressure is selected from a range of 50 Pa-500 Pa or preferably from a range of 100 Pa-200 Pa. Hereinafter, such a pressure range will be referred to as sub-base pressure zone. Also, a start pressure is defined for the first roughing. For example, the start pressure of the first roughing is the atmospheric pressure, for instance.

When the pressure measured by the pressure sensor 94 reaches the termination pressure of the first roughing, the control unit 100 closes the rough valve 72 so as to terminate the first roughing. Subsequently, the control unit 100 opens the purge valve 74 and starts the first purge. The first purge raises the pressure inside the housing 38.

When the pressure measured by the pressure sensor 94 reaches the start pressure of the first roughing, the control unit 100 closes the purge valve 74 and terminates the first purge. At this time, the first-time first roughing and the first-time first purge (i.e., a combination of the first roughing and the first purge performed for the first time) are terminated. Subsequently, the control unit 100 opens the rough valve 72 and initiates the first roughing for a second time.

When the first purge is terminated and before the first roughing is started, the control unit 100 determines whether the condition to terminate the first rough-and-purge is met. The condition to terminate the first rough-and-purge may require that the first purge (or the first roughing) is performed a predefined number of times (once or multiple times; four times in the case of FIG. 3). When the condition for termination is met, the control unit 100 terminates the first rough-and-purge and performs the first buildup test (S16). When the condition for termination is not met, the control unit 100 continues the first rough-and-purge (in other words, the first roughing is started).

In this way, during the first rough-and-purge, the control unit 100 controls the pressure in the housing 38 in a first pressure range. The first pressure range is a range defined by the start pressure and the termination pressure of the first roughing. In the first rough-and-purge, the cryopump internal pressure varies reciprocally in the first pressure range in an oscillating manner.

When the first rough-and-purge is terminated, the control unit 100 starts the first buildup test or buildup determination. The buildup test in cryopump regeneration is a process to determine whether the gas has been properly discharged from the cryopump 10. The control unit 100 determines that the test is passed when the pressure rise slope, or rate of pressure rise, from an initial pressure does not exceed a threshold for determination.

The control unit 100 opens the rough valve 72 and performs rough evacuation of the housing 38 until the initial pressure for the first buildup test is reached. The initial pressure is selected from the sub-base pressure zone. For example, the initial pressure is equal to or lower than the termination pressure of the first roughing. The control unit 100 terminates the roughing when the pressure measured by the pressure sensor 94 reaches the initial pressure. The control unit 100 closes the valves including the rough valve 72 and maintains the housing 38 airtight. Concurrently, the control unit 100 starts measuring time for determination and monitors the pressure measured by the pressure sensor 94. The control unit 100 calculates the amount of pressure rise, i.e., increment from the initial pressure, occurring when a predefined period of time for determination elapses. The control unit 100 defines the obtained amount of pressure rise as the pressure rise slope (or rate of pressure rise) of the housing 38.

When the first buildup test is passed, i.e., when the rate of pressure rise in the housing 38 does not exceed the threshold, the control unit 100 terminates the first discharging process and starts the second discharging process (S18). Meanwhile, when the first buildup test is failed, i.e., when the rate of pressure rise in the housing 38 exceeds the threshold, the control unit 100 continues the first discharging process. In this case, the control unit 100 performs roughing again to the initial pressure and monitors the rate of pressure rise once again. Alternatively, the control unit 100 may perform the first rough-and-purge again before performing the first buildup test.

When the first discharging process is terminated, ice and liquid water will be properly (preferably, completely) removed from the surface of the cryopanels 18 and 19. The gas that remains in the cryopump 10 is water vapor. Water vapor is adsorbed on the surfaces of the adsorbent 27, the cryopanels 18 and 19, and other structures.

The second discharging process or step is a process mainly for desorbing water adsorbed on the adsorbent 27 and discharging the resultant water vapor. The second discharging process includes the second rough-and-purge (S20) and the second buildup test (S22). For convenience, roughing and purge steps in the second rough-and-purge may be referred to as the second roughing and the second purge, respectively. The second rough-and-purge is substantially identical to the first rough-and-purge except that the termination pressure of the second roughing is lower than the termination pressure of the first roughing.

When the first discharging process is terminated (i.e., when the first buildup test is passed), the control unit 100 starts the second rough-and-purge. The control unit 100 performs the second rough-and-purge immediately after the first discharging process.

In the second rough-and-purge, the control unit 100 initially opens the rough valve 72 so as to perform the second roughing. In the first-time second roughing (i.e., the second roughing performed for the first time), the housing 38 is depressurized to the second roughing termination pressure lower than the pressure in the sub-base pressure zone occurring when the first buildup test is terminated. The second roughing termination pressure is selected from the base pressure zone. For example, the second roughing termination pressure may be about 10 Pa. When the pressure measured by the pressure sensor 94 reaches the second roughing termination pressure, the control unit 100 terminates the second roughing and starts the first-time second purge. The second purge raises the pressure in the housing 38 to a pressure at which water adsorbed on the adsorbent 27 is not frozen. When the pressure measured by the pressure sensor 94 reaches the start pressure of the second rouging, the control unit 100 terminates the second purge and starts the second roughing. For example, the start pressure of the second roughing is the atmospheric pressure.

When the second purge is terminated and before the second roughing is started, the control unit 100 determines whether the condition to terminate the second rough-and-purge is met. The condition to terminate the second rough-and-purge may require that the second purge (or the second roughing) is performed a predefined number of times (once or multiple times; three times in the case of FIG. 3). When the condition for termination is met, the control unit 100 terminates the second rough-and-purge and performs the second buildup test or buildup determination (S22). When the condition for termination is not met, the control unit 100 continues the second rough-and-purge (in other words, the second roughing is started).

In this way, during the second rough-and-purge, the control unit 100 controls the pressure in the housing 38 in a second pressure range. In the rough-and-purge step, the cryopump internal pressure varies reciprocally in the second pressure range in an oscillating manner. The second pressure range is a range defined by the start pressure and the termination pressure of the second roughing. The second pressure range is extended to a low pressure region below the first pressure range. In other words, the low pressure region is lower than the sub-base pressure zone. The second discharging process includes alternately evacuating the cryopump housing to the low pressure region and supplying the purge gas to the cryopump housing.

In this embodiment, the control unit 100 sequentially performs termination of the first discharging process, evacuation of the housing 38 from the first pressure range to the low pressure range, and supplying of the purge gas to the housing 38. By performing the processes sequentially, the purge gas can be automatically introduced into the cryopump 10 at the initial stage in the second discharging process.

When the second rough-and-purge is terminated, the control unit 100 starts the second buildup test. The control unit 100 performs roughing of the housing 38 until the initial pressure for the second buildup test is reached. The initial pressure is selected from the base pressure zone. For example, the initial pressure is equal to or lower than the termination pressure of the second roughing. Therefore, the second buildup test is performed in a higher vacuum region than the first buildup test. The control unit 100 stops the roughing when the pressure measured by the pressure sensor 94 reaches the initial pressure. The control unit 100 closes the valves including the rough valve 72 and maintains the housing 38 airtight. Concurrently, the control unit 100 starts measuring time for determination and monitors the pressure measured by the pressure sensor 94. The control unit 100 defines the amount of pressure rise at the time that a predefined period of time for determination elapses as the rate of pressure rise in the housing 38.

When the second buildup test is passed, i.e., when the rate of pressure rise in the housing 38 does not exceed the threshold, the control unit 100 terminates the second discharging process and starts the cool down process (S24). Therefore, the second buildup test can be considered as a cool down starting test, i.e., a determination as to whether to start cool down. Meanwhile, when the second buildup test is failed, i.e., when the rate of pressure rise exceeds the threshold, the control unit 100 continues the second discharging process. In this case, the control unit 100 performs roughing again to the initial pressure and monitors the rate of pressure rise once again. Alternatively, the control unit 100 may perform the second rough-and-purge again before performing the second buildup test.

In the temperature-raising process and the discharging process, the control unit 100 may determine whether a positive pressure occurs inside relative to the exterior of the housing 38, based on the measurement of the pressure sensor 94. If the control unit 100 determines that a positive pressure occurs, the control unit 100 may open the vent valve 70. Opening the vent valve allows releasing of a high pressure occurring within the housing 38 to the outside. If the control unit 100 determines that the positive pressure does not occur, the vent valve 70 will be closed. In this manner, the leakage into the housing 38 is sealed off while the interior of the housing 38 is depressurized.

When the second discharging process is terminated, the control unit starts the cool down process (S24). The cool down process or step is a process to cool the cryopanels 18 and 19 and the adsorbent 27 again in order to resume the vacuum pumping operation. The cooling operation of the refrigerator 16 is started. Roughing may be performed in at least a part of the cooling process. For example, roughing may be continued since the start of cooling until the roughing termination pressure or the roughing termination temperature is reached. The control unit 100 determines whether the measurement of the cryopanel temperature reaches the cryopanel cooling temperature defined for the vacuum pumping operation. The control unit 100 continues the cool down process until the cryopanel cooling temperature is reached and terminates the cool down process when the cooling temperature is reached. This completes the regeneration process. The vacuum pumping operation of the cryopump 10 is resumed.

Figure 3:
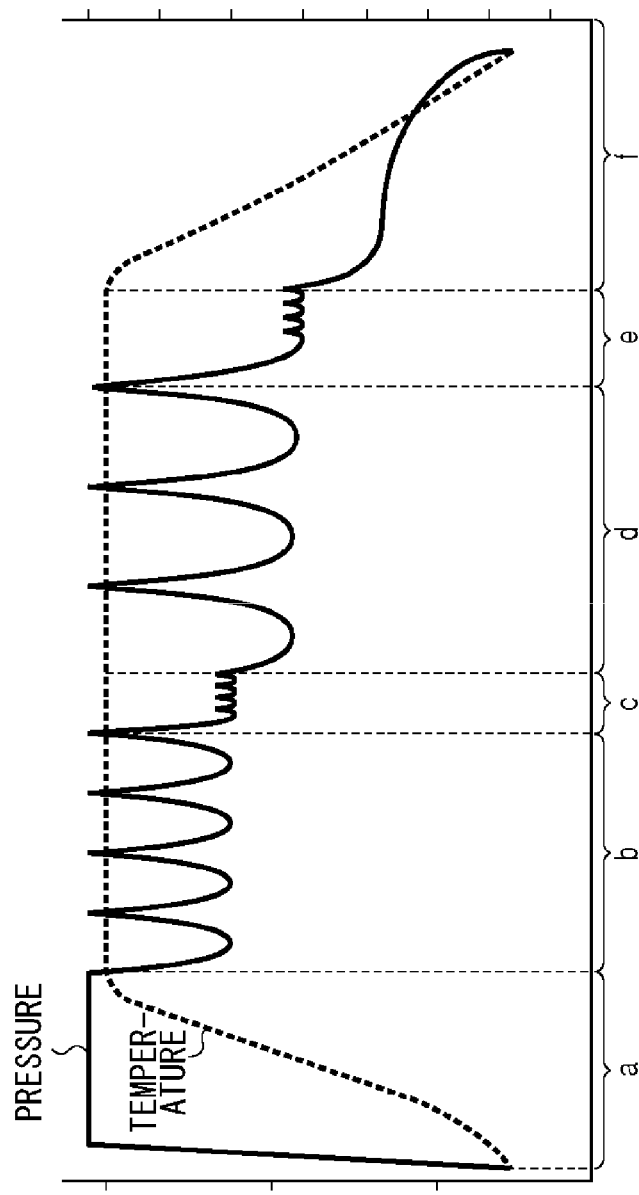
FIG. 3 is a graph showing a regeneration sequence according to an embodiment of the present invention.

FIG. 3 is a diagram showing a regeneration sequence according to an embodiment of the present invention. The regeneration sequence is controlled by the control unit 100 as described above. FIG. 3 schematically shows changes with time in temperature and pressure during a regeneration of the cryopump 10. The temperatures shown in FIG. 3 are those measured by the second temperature sensor 92, and the pressures are those measured by the pressure sensor 94.

The entire period of regeneration sequence from start to finish, as shown in FIG. 3, is divided into six periods of period a to period f. Period a corresponds to the above-described temperature-raising process, periods b and c to the first discharging process, periods d and e to the second discharging process, and period f to the cooling process. The first rough-and-purge and the first buildup test are performed in periods b and c, respectively. The second rough-and-purge and the second buildup test are performed in periods d and e, respectively.

The reversal heating of the refrigerator 16 is performed in period a. Through the reversal heating of the refrigerator 16 and nitrogen purge, the second stage 21 is heated up to a target temperature (e.g., 300 K). As a result of the nitrogen purge, the pressure inside the cryopump reaches the atmospheric pressure quickly. Majority of the gas other than water is released from the cryopanels 18 and 19 while the temperature is being raised.

Period b is used mainly for vaporizing and discharging water. During the first rough-and-purge as indicated by period b, the pressure reduction in the cryopump by rough evacuation is carried out within a pressure range where water does not freeze. The lowest pressure is about 100 Pa, for instance. The first half of period b is a period mainly for melting the ice deposited on the cryopanels 18 and 19. The second half of period b is a period mainly for vaporizing water.

Period c is a first roughing period for discharge of water vapor through rough evacuation. At this time, the nitrogen purge is stopped. In period c, the rough evacuation and the rate-of-rise test are repeated. During the test, the rough evacuation is stopped. When the rate of pressure rise becomes smaller than a threshold value (that is, when the first buildup test is passed), period c comes to an end.

During the second rough-and-purge as indicated by period d, the cryopump 10 is roughly evacuated to the base pressure zone. The lowest pressure is lower than that of the first rough-and-purge and is about 10 Pa, for instance. The evaporation speed is generally inversely proportional to the pressure. For this reason, rough evacuation to attain a low pressure has the effect of increasing the evaporation speed of water from the adsorbent 27.

It should however be noted that the water that remains on the adsorbent 27 may be turned into ice again in this process due to excessive vaporization heat. Raising the pressure by the purge gas has the effect of reducing the vaporization speed of water. The purge gas also has the effect of heating the adsorbent 27. These effects are useful to prevent freezing or promote deicing of water on the adsorbent 27.

In period e, the rough evacuation and the rate-of-rise test are repeated in a higher vacuum region than those in period c. During the test, rough evacuation is stopped. When the rate of pressure rise becomes smaller than a threshold value (that is, when the second buildup test is passed), period e comes to an end.

In period f, the cooling operation of the refrigerator 16 is started. Concurrently, the rough evacuation is performed. When the target cooling temperature is reached, the rough evacuation is terminated. This completes the regeneration process and the vacuum pumping operation is resumed.

As described above, according to the embodiment, the purge gas can be supplied in the stage of regenerating the adsorbent 27 prior to the first-time determination as to whether the cool down should be started. Supplying of the purge gas in the initial stage during the adsorbent regeneration may prevent freezing or promote deicing of water on the adsorbent 27. In addition, rough evacuation to attain a low pressure of the base pressure zone promotes evaporation of water from the adsorbent 27. In this way, water can be efficiently discharged from the adsorbent 27. Accordingly, the time required to regenerate the adsorbent is reduced.

The cryopump 10 according to the exemplary embodiment is useful in applications in which a large amount of water is to be pumped (e.g., high-current ion implanter).

Described above is an explanation based on an exemplary embodiment. The embodiment is intended to be illustrative only and it will be obvious to those skilled in the art that various modifications to design and variations are possible, and that such modifications are also within the scope of the present invention.

In the exemplary embodiment described above, the roughing pressure remains constant during the second discharging process. However, the roughing termination pressure in a plurality of cycles during the second discharging process may be reduced stepwise in the low pressure region below the first pressure range. Alternatively, the roughing termination pressure in the second discharging process may be randomly defined in the low pressure region below the first pressure range.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2013-49483, filed on Mar. 12, 2013, the entire content of which is incorporated herein by reference.

What is claimed is:

1. A cryopump comprising:
   a cryopanel;
   a cryopump housing arranged to enclose the cryopanel;
   a control unit configured to control evacuation of the cryopump housing and supply of a purge gas to the cryopump housing for full regeneration of the cryopanel,
   wherein the control unit is configured to perform:
      a first rough-and-purge process that includes alternately performing a first rough-and-purge evacuating of the cryopump housing and a first rough-and-purge supplying of the purge gas in a first pressure range, and
      a second rough-and-purge process that includes, subsequent to the first rough-and-purge process, alternately and cyclically repeating a second rough-and-purge evacuating of the cryopump housing to a low pressure region below the first pressure range and a second rough-and-purge supplying of the purge gas to the cryopump housing, and
   wherein the second rough-and-purge process includes making a determination at least once in the low pressure region as to whether the second rough-and-purge process should be terminated, and a plurality of cycles of the alternately and cyclically repeating of the second rough-and-purge evacuating of the cryopump housing and the second rough-and-purge supplying of the purge gas to the cryopump housing are performed prior to a first-time determination as to whether the second rough-and-purge process should be terminated.

2. The cryopump according to claim 1, wherein the control unit sequentially performs termination of the first rough-and-purge process, the second rough-and-purge evacuating of the cryopump housing from the first pressure range to the low pressure region, and the second rough-and-purge supplying of the purge gas to the cryopump housing.

3. The cryopump according to claim 1, wherein the control unit terminates the second rough-and-purge supplying of the purge gas based on a measured pressure in the cryopump housing.

4. The cryopump according to claim 1, wherein the control unit performs, prior to the first rough-and-purge process, a temperature-raising process that includes heating the cryopanel to a regeneration temperature, which is higher than a cooling temperature of a cryopump vacuum pumping operation.

5. The cryopump according to claim 1, wherein the control unit performs, after the second rough-and-purge process, a cool down process that includes cooling the cryopanel to a cooling temperature of a cryopump vacuum pumping operation.

6. The cryopump according to claim 1, wherein
the control unit performs, if the first-time determination as to whether the second rough-and-purge process should be terminated is failed, a further plurality of cycles of the second rough-and-purge evacuating of the cryopump housing and the second rough-and-purge supplying of the purge gas to the cryopump housing prior to a second-time determination as to whether the second rough-and-purge process should be terminated.

7. A cryopump full regeneration method comprising:
a first rough-and-purge process that includes alternately performing a first rough-and-purge evacuating of a cryopump housing and a first rough-and-purge supplying of a purge gas in a first pressure range, and
a second rough-and-purge process that includes, subsequent to the first rough-and-purge process, alternately and cyclically repeating a second evacuating of the cryopump housing to a low pressure region below the first pressure range and a second rough-and-purge supplying of the purge gas to the cryopump housing, wherein
the second rough-and-purge process includes making a determination at least once in the low pressure region as to whether the second rough-and-purge process should be terminated, and a plurality of cycles of the alternately and cyclically repeating of the second rough-and-purge evacuating of the cryopump housing and the second rough-and-purge supplying of the purge gas to the cryopump housing are performed prior to a first-time determination as to whether the second rough-and-purge process should be terminated.

8. The method according to claim 7, wherein
termination of the first rough-and-purge process, the second rough-and-purge evacuating of the cryopump housing from the first pressure range to the low pressure region, and the second rough-and-purge supplying of the purge gas to the cryopump housing are sequentially performed.

9. The method according to claim 7, wherein
the second rough-and-purge supplying of the purge gas is terminated based on a measured pressure in the cryopump housing.

10. The method according to claim 7, further comprising:
prior to the first rough-and-purge process, a temperature-raising process that includes heating a cryopanel to a regeneration temperature, which is higher than a cooling temperature of a cryopump vacuum pumping operation.

11. The method according to claim 7, further comprising:
after the second rough-and-purge process, a cool down process that includes cooling a cryopanel to a cooling temperature of a cryopump vacuum pumping operation.

\* \* \* \* \*